United States Patent
Lee et al.

(10) Patent No.: US 10,417,472 B2
(45) Date of Patent: Sep. 17, 2019

(54) DEVICE AND METHOD FOR MEASURING THREE-DIMENSIONAL SHAPE

(71) Applicant: KOH YOUNG TECHNOLOGY INC., Seoul (KR)

(72) Inventors: Hyunki Lee, Daegu (KR); Kwangill Koh, Seoul (KR)

(73) Assignee: KOH YOUNG TECHNOLOGY INC., Seoul (KR)

( * ) Notice: Subject to any disclaimer, the term of this patent is extended or adjusted under 35 U.S.C. 154(b) by 141 days.

(21) Appl. No.: 15/110,494

(22) PCT Filed: Jan. 8, 2015

(86) PCT No.: PCT/KR2015/000210
§ 371 (c)(1),
(2) Date: Jul. 8, 2016

(87) PCT Pub. No.: WO2015/105360
PCT Pub. Date: Jul. 16, 2015

(65) Prior Publication Data
US 2016/0335472 A1    Nov. 17, 2016

(30) Foreign Application Priority Data
Jan. 10, 2014 (KR) .................... 10-2014-0003407

(51) Int. Cl.
*G06K 9/00* (2006.01)
*G01B 9/02* (2006.01)
(Continued)

(52) U.S. Cl.
CPC ....... *G06K 9/00013* (2013.01); *G01B 9/0203* (2013.01); *G01B 9/02054* (2013.01);
(Continued)

(58) Field of Classification Search
CPC .......... G06K 9/00208; G06K 9/00013; G06K 9/00201; G01B 9/02091; G01B 9/0203;
(Continued)

(56) References Cited

U.S. PATENT DOCUMENTS 4,648,717 A * 3/1987 Ross .................. G01B 11/2536
250/558
5,135,309 A * 8/1992 Kuchel .............. G01B 11/2531
250/237 G
(Continued)

FOREIGN PATENT DOCUMENTS

CN    101893428    11/2010
CN    102589476    7/2012
(Continued)

OTHER PUBLICATIONS

Written Opinion with English Translation for International Application No. PCT/KR2015/000210, dated Apr. 10, 2015.
(Continued)

*Primary Examiner* — Zaihan Jiang
(74) *Attorney, Agent, or Firm* — Kile Park Reed & Houtteman PLLC

(57) ABSTRACT

A method for measuring a three-dimensional shape includes the steps of: forming a pattern on a light irradiated to an object from a light source unit installed in an electronic device by a pattern unit installed in the electronic device; generating image data by photographing the object to which the light on which the pattern is formed is irradiated by a camera unit installed in the electronic device; generating phase data for the object using the image data, and generating, using the phase data by a data generation unit, feature value data for a feature value of the object; and determining, by a determination unit, whether the feature value data is
(Continued)

identical to pre-stored reference value data using the feature value data and the pre-stored reference value data.

16 Claims, 7 Drawing Sheets

(51) Int. Cl.
  *G01B 11/25* (2006.01)
  *G06F 21/32* (2013.01)
  *G06T 7/521* (2017.01)
  *G06T 7/586* (2017.01)
(52) U.S. Cl.
  CPC ...... *G01B 9/02091* (2013.01); *G01B 11/2531* (2013.01); *G06F 21/32* (2013.01); *G06K 9/00201* (2013.01); *G06K 9/00208* (2013.01); *G06T 7/521* (2017.01); *G06T 7/586* (2017.01); *G06T 2207/10016* (2013.01); *G06T 2207/10101* (2013.01); *G06T 2207/10152* (2013.01); *G06T 2207/20056* (2013.01)
(58) Field of Classification Search
  CPC . G01B 11/2531; G01B 9/02054; G06F 21/32; G06T 7/586; G06T 2207/10016; G06T 2207/10101
  USPC .......................................................... 348/139
  See application file for complete search history.

(56) References Cited

U.S. PATENT DOCUMENTS

| | | | |
|---|---|---|---|
| 7,327,859 B1* | 2/2008 | Chau | G06K 9/00046 382/116 |
| 7,791,734 B2* | 9/2010 | Olivier | A61B 3/14 356/479 |
| 2007/0165246 A1* | 7/2007 | Kimmel | G01B 11/2513 356/610 |
| 2007/0280557 A1* | 12/2007 | Choi | G03F 7/70633 382/294 |
| 2008/0170774 A1* | 7/2008 | Xiong | G01N 21/95607 382/144 |
| 2010/0295941 A1 | 11/2010 | Jeong et al. | |
| 2011/0175981 A1* | 7/2011 | Lai | H01L 27/14621 348/46 |
| 2011/0235871 A1* | 9/2011 | Byren | G06K 9/00033 382/124 |
| 2011/0261191 A1* | 10/2011 | Byren | G01S 7/4816 348/135 |
| 2011/0275932 A1* | 11/2011 | Leblond | A61B 5/0062 600/425 |
| 2012/0194784 A1* | 8/2012 | Shih | A61B 3/14 351/221 |
| 2012/0214546 A1* | 8/2012 | Osaka | H04M 1/0272 455/556.1 |
| 2013/0148183 A1* | 6/2013 | Dallas | G03H 1/2202 359/32 |
| 2013/0222578 A1 | 8/2013 | Jeong et al. | |
| 2015/0110347 A1* | 4/2015 | Suzuki | G06K 9/00355 382/103 |
| 2015/0324566 A1* | 11/2015 | Miura | G06K 9/0004 726/19 |
| 2016/0153772 A1 | 6/2016 | Jeong et al. | |
| 2017/0031318 A1* | 2/2017 | Stahl | G03H 1/0443 |

FOREIGN PATENT DOCUMENTS

| | | |
|---|---|---|
| JP | 2001-351098 | 12/2001 |
| JP | 2013-22338 | 2/2013 |
| KR | 10-2005-0020327 | 3/2005 |
| KR | 20-0399917 | 11/2005 |
| KR | 10-2010-0066192 | 6/2010 |

OTHER PUBLICATIONS

International Search Report for International Application No. PCT/KR2015/000210, dated Apr. 10, 2015.
Chinese Office Action with English translation of Chinese Application No. 201580003909, dated Nov. 27, 2018.
Mengyang Liu et al.; "Biometric Mapping of Fingertip Eccrine Glands with Optical Coherence Tomography"; IEEE Photonics Technology Letters, vol. 22, No. 22, Nov. 15, 2010; pp. 1677-1679.
Anke Bossen et al.; "Internal Fingerprint Identification with Optical Coherence Tomography"; IEEE Photonics Technology Letters, vol. 22, No. 7, Apr. 1, 2010; pp. 507-509.
Chinese Office Action with English translation issued by the China National Intellectual Property Administration; dated Jun. 28, 2019.

\* cited by examiner

DEVICE AND METHOD FOR MEASURING THREE-DIMENSIONAL SHAPE

TECHNICAL FIELD

The present disclosure relates to a device and method for measuring a three-dimensional shape. More specifically, the present disclosure relates to a method and device for measuring a three-dimensional shape, wherein the accuracy of fingerprint recognition can be improved by performing a precise three-dimensional measurement on an object to be measured through a three-dimensional measurement device using a grid pattern, optical interference, OCT and the like, particularly by recognizing a fingerprint using feature values generated by measuring a three-dimensional shape of a finger of a user.

BACKGROUND ART

Techniques for recognizing a fingerprint, a palm, a voice, a retina, an iris, a face, a blood vessel or the like are used as general body authentication means. In the case of a fingerprint, a retina or a blood vessel among them, authentication is achieved using a fingerprint, capillary vessels of an eyeball or a venous pattern.

For example, a fingerprint refers to a pattern of ridges created in the form of a certain pattern from the contour of the epidermis of a person's fingertip. Fingerprints created on fingers of different persons are formed in patterns different from one another, and a fingerprint that has been created once does not change. Due to the features of the fingerprint, i.e., fingerprints are created in different patterns on fingers of different persons and do not change once they have been created, the fingerprints are frequently used for personal authentication these days. Accordingly, methods of recognizing a user's fingerprint are being developed recently for personal authentication.

A system for recognizing a user's fingerprint may be configured to include a contact member formed of a transparent material with which a finger of a user is to be brought into contact, an illumination unit for radiating light on the finger of the user in contact with the contact member, a camera unit for photographing the finger that is in contact with the contact member and irradiated with the light, and a recognition unit for recognizing and comparing the fingerprint using a fingerprint image generated by photographing the finger using the camera unit. At this point, the recognition unit may extract a pattern or the like of the fingerprint from the fingerprint image and then recognize and compare the fingerprint.

However, the image generated by photographing the finger may be distorted since the system is basically a two-dimensional type and the light is not radiated uniformly due to the ridges or the like on the finger in a state where the finger is in contact with the contact member when the finger is photographed through the camera, or the image generated by photographing the finger may be distorted depending on states of the finger of the user (e.g., states where the finger is wet or dry or the fingerprint is partially lost). That is, if a fingerprint is recognized using a distorted image, there is a problem in that the recognition unit does not easily extract the pattern of the fingerprint, resulting in lowered accuracy of fingerprint recognition.

Accordingly, there is a need for development of a device and method for measuring a three-dimensional shape, wherein a three-dimensional shape of each part of a body can be measured or the accuracy of recognition can be improved in use as a body authentication means.

Meanwhile, although a conventional three-dimensional measurement method computes a shape through a pin contact on a surface of an object to be measured in a contact manner, a non-contact type three-dimensional measurement method using laser and light is utilized in a variety of industries with the development of new techniques. However, this has a disadvantage in that there is deterioration of portability or convenience since a measurement should be made in a state where a measurement device and the object to be measured are fixed, due to vulnerability to vibration or the like.

SUMMARY

An embodiment of the present disclosure may provide a device and method for measuring a three-dimensional shape, wherein a three-dimensional shape of an object to be measured can be measured based on a grid pattern light, optical interference and an OCT scheme in a portable equipment.

Another embodiment of the present disclosure may provide a device and method for measuring a three-dimensional shape, wherein the accuracy of fingerprint recognition can be improved by extracting feature values of a fingerprint from phase data on a phase of the fingerprint and identifying a user by comparing the extracted feature values with pre-stored feature values of the fingerprint.

Objectives disclosed in relation to certain embodiments of the present disclosure are not limited to that mentioned above, and other objectives unmentioned above may be clearly understood by those skilled in the art from the following descriptions.

A device for measuring a three-dimensional shape according to an aspect of the present disclosure for solving the problems includes a light source unit; a pattern unit for forming a pattern on light radiated from the light source unit; a camera unit for generating image data by photographing an object irradiated with the light formed with the pattern; and a data generation unit for generating phase data of the object using the image data and generating feature value data of the object using the phase data, wherein the light source unit, the pattern unit, the camera unit and the data generation unit may be installed in an electronic device.

The pattern unit may include a first filter for forming a first pattern on the light radiated from the light source unit and passing through the pattern unit, a second filter for forming a second pattern on the light radiated from the light source unit and passing through the pattern unit, and a third filter for forming a third pattern on the light radiated from the light source unit and passing through the pattern unit.

The first filter, the second filter and the third filter may be arranged in a circular fashion.

The device may further include a moving unit for sequentially arranging the first filter, the second filter and the third filter in the front of the light source unit by rotationally moving the pattern unit.

The first filter, the second filter and the third filter may be arranged in a row.

The device may further include a moving unit for sequentially arranging the first filter, the second filter and the third filter in the front of the light source unit by linearly moving the pattern unit.

The pattern unit may include a pattern indication device for indicating filters for forming the first pattern, the second pattern and the third pattern on the light radiated from the light source unit and passing through the pattern unit.

The pattern unit may include a cylinder lens for collecting the light radiated from the light source unit, a rotational polygon mirror for redirecting the light collected through the cylinder lens while rotating in one direction, and a filter for forming a pattern on the light redirected by the rotational polygon mirror and passing through the pattern unit.

The pattern unit may include at least one slit for forming a pattern on the light radiated from the light source unit and passing through the pattern unit.

The device may further include a vibration unit having a vibration weight for generating vibration and a rotation unit for rotating the vibration weight in one direction.

The light source unit may include a first light source unit, a second light source unit, and a third light source unit; and the pattern unit may include a first pattern unit disposed in the front of the first light source unit to form a first pattern on the radiated light, a second pattern unit disposed in the front side of the second light source unit to form a second pattern on the radiated light, and a third pattern unit disposed in the front of the third light source unit to form a third pattern on the radiated light.

The pattern unit may be disposed in the front of the light source unit and the camera unit.

The object may be a finger of a subject to be measured, and the phase data may be phase data of a fingerprint of the finger.

The device may further include a determination unit for determining whether the feature value data and pre-stored reference value data match or not.

The object may be at least a part of a body or a skin tissue of a subject to be measured.

A method of measuring a three-dimensional shape according to another aspect of the present disclosure for solving the problems includes the steps of: forming, by a pattern unit installed in portable equipment, a pattern on light radiated from a light source unit installed in an electronic device to an object; generating, by a camera unit installed in the portable equipment, image data by photographing the object irradiated with the light formed with the pattern; and generating, by a data generation unit installed in the portable equipment, phase data of the object using the image data and generating feature value data on a feature value of the object using the phase data.

A device for measuring a three-dimensional shape according to a further aspect of the present disclosure for solving the problems includes a light source unit; a pattern unit for forming a pattern on light radiated from the light source unit; a camera unit for generating image data by photographing a finger of a user irradiated with the light formed with the pattern; a data generation unit for generating phase data of the finger of the user using the image data and generating feature value data of the finger of the user using the phase data; and a determination unit for determining whether the feature value data and pre-stored reference value data match or not.

A device for measuring a three-dimensional shape according to a still further aspect of the present disclosure for solving the problems includes a light source unit; a beam splitter unit for splitting light radiated from the light source unit; a reference mirror unit for reflecting light incident from the beam splitter unit; a camera unit for generating OCT (Optical Coherence Tomography) image data by photographing light incident on and reflected by an object from the beam splitter unit and the light reflected by the reference mirror unit; a data generation unit for generating phase data of the object using the image data and generating feature value data of a feature value of the object using the phase data; and a determination unit for determining whether the feature value and pre-stored reference value data match or not.

The determination unit may determine whether the object is a finger or not based on the feature value of the object, and if a foreign material other than a finger is included, the determination unit may determine that the object is an artificial fingerprint.

According to the method and device for measuring a three-dimensional shape according to some embodiments of the present disclosure, a three-dimensional shape of an object to be measured can be accurately measured based on grid pattern light, optical interference and an OCT scheme in portable equipment.

According to the method and device for measuring a three-dimensional shape according to some embodiments of the present disclosure, the accuracy of user identification can be enhanced by generating feature value data of the object from phase data of the object by the data generation unit and processing the user authentication using feature value data by the determination unit.

According to the method and device for measuring a three-dimensional shape according to some embodiments of the present disclosure, a three-dimensional fingerprint pattern can be effectively recognized by extracting, by the data generation unit, phase data of the depth of fingerprint ridges from finger image data generated by photographing a finger irradiated with light formed with a pattern.

The effects disclosed in the present disclosure are not limited to those mentioned above, and unmentioned other effects may be clearly understood by those skilled in the art from the following descriptions.

Figure 1:
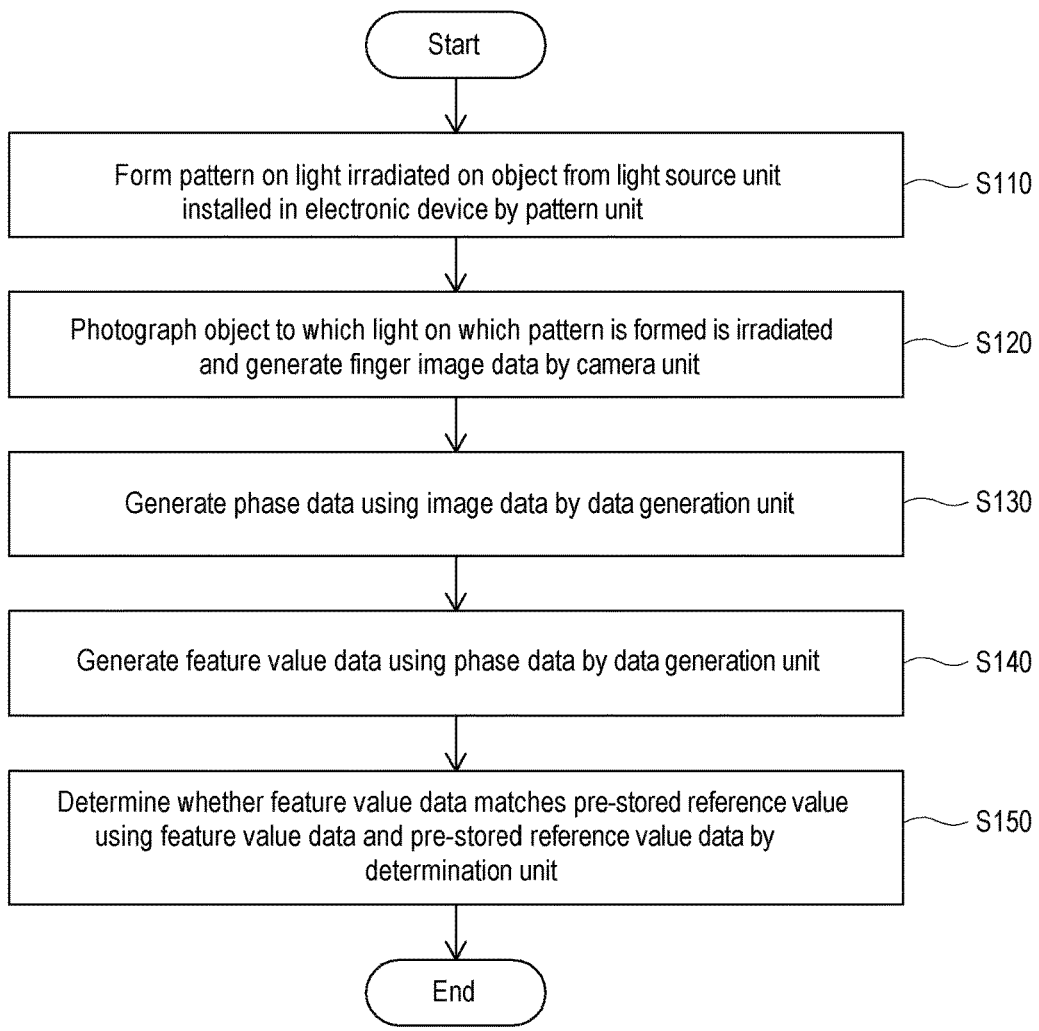
FIG. 1 is a flowchart showing a sequence of a method of measuring a three-dimensional shape according to an embodiment of the present disclosure.

110: Pattern unit
120: Moving unit

130: Light source unit
140: Camera unit
150: Data generation unit
160: Determination unit
170: Control unit
180: Vibration unit

DETAILED DESCRIPTION

The objectives and effects, and technical constitutions for accomplishing them will be apparent with reference to embodiments described below in detail together with the accompanying drawings. If specific descriptions of known functions or constitutions are considered to unnecessarily blur the subject matter of the present disclosure in describing the embodiments, the detailed descriptions thereof will be omitted. In addition, the terms described below are terms defined in consideration of structures, roles, functions and the like in the present disclosure and may be varied according to an intention of a user or operator, practices or the like.

However, the present disclosure is not limited to the embodiments disclosed below but may be implemented in various different forms. The embodiments are provided merely to complete the disclosure of the present invention and to fully provide the scope of the present disclosure to a person having ordinary skill in the art to which the present disclosure pertains. The present disclosure is defined only by the scope of the claims. Therefore, the definition should be construed based on the disclosure throughout the specification.

Throughout the specification, when it is said that a unit "includes" or "has" a component, it means that the unit does not exclude another component but may further include another component, unless otherwise specifically mentioned.

Hereinafter, methods and devices for measuring a three-dimensional shape according to embodiments of the present disclosure will be described in detail with reference to the accompanying drawings. In addition, an object of which a three-dimensional shape is to be measured may be at least one of a part of the body and skin tissue of a subject to be measured. Hereinafter, descriptions will be made assuming that the object is a finger, for the convenience of explanation.

FIG. 1 is a flowchart showing a sequence of a method of measuring a three-dimensional shape according to an embodiment of the present disclosure.

Figure 2:
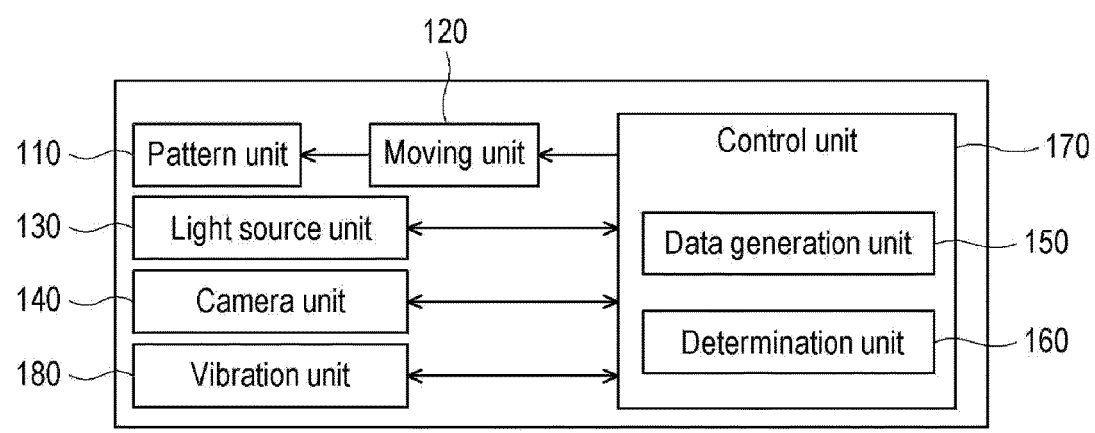
FIG. 2 is a view showing a configuration of a device for measuring a three-dimensional shape according to an embodiment of the present disclosure.

FIG. 2 is a view showing a configuration of a device for measuring a three-dimensional shape according to an embodiment of the present disclosure. Referring to FIGS. 1 and 2, a pattern unit 110 installed in an electronic device (not shown) forms a pattern on a light radiated on a finger of a user from a light source unit 130 installed in the electronic device (step S110). The pattern unit 110 may be installed in the electronic device to be spaced apart from the light source unit 130 by a predetermined distance. As a result, the finger of the user is irradiated with the light, which has been formed with a predetermined pattern, from the light source unit 130. At this point, the predetermined pattern may be a grid pattern.

Meanwhile, although the electronic device may be installed in the vicinity of a door or include a mobile device such as a smart phone or a tablet PC as portable equipment, it is not limited thereto. That is, the electronic device may include all devices that can be manufactured in a compact, portable or handheld manner.

Such an electronic device may be powered in a wired or wireless manner or may also be powered using a separate battery and wirelessly.

Figure 3:
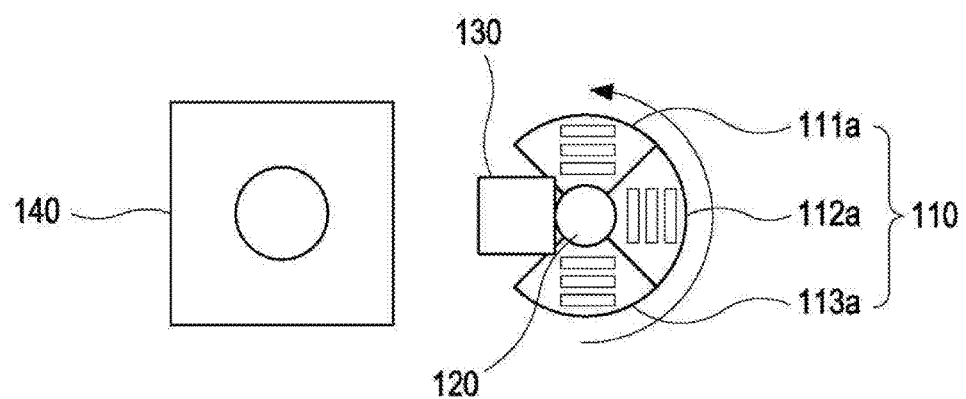
FIG. 3 is a view schematically showing a first embodiment of a configuration applicable to a pattern unit shown in FIG. 2.

The pattern unit 110 may include a first filter 111a for forming a first pattern on the light radiated from the light source unit 130, a second filter 112a for forming a second pattern on the light radiated from the light source unit 130, and a third filter 113a for forming a third pattern on the light radiated from the light source unit 130 (see FIG. 3). The first pattern, the second pattern and the third pattern may be grid patterns of different phases.

In addition, the first filter 111a, the second filter 112a and the third filter 113a may be arranged in a circular fashion. A moving unit 120 connected to the pattern unit 110 may rotationally move the first filter 111a, the second filter 112a and the third filter 113a of the pattern unit 110 to be sequentially disposed in the front of the light source unit 130. At this point, the moving unit 120 is electrically connected to a control unit 170 so that an operation thereof may be controlled by the control unit 170.

Figure 4:
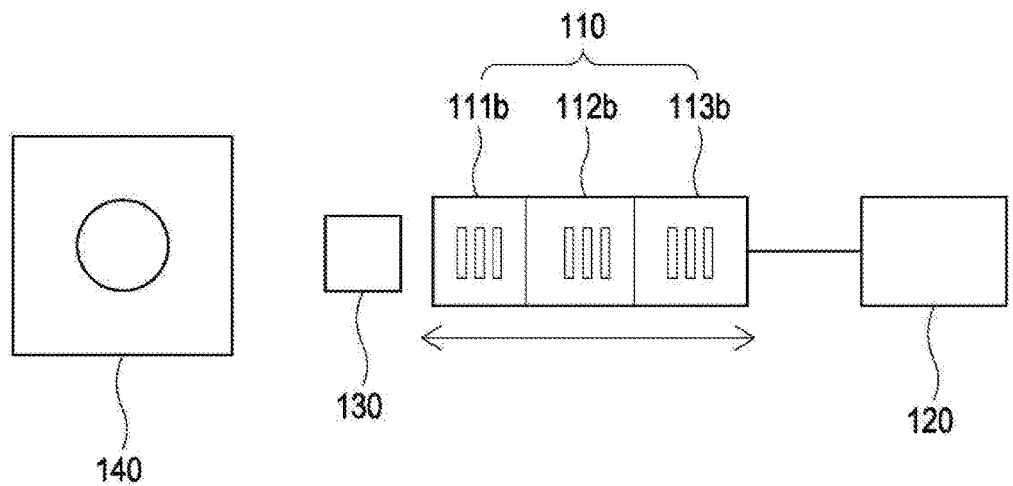
FIG. 4 is a view schematically showing a second embodiment of a configuration applicable to the pattern unit shown in FIG. 2.

Meanwhile, the first filter 111b, the second filter 112b and the third filter 113b may be arranged in a row (see FIG. 4). When the first filter 111b, the second filter 112b and the third filter 113b are arranged in a row, the moving unit 120 may linearly move the first filter 111b, the second filter 112b and the third filter 113b of the pattern unit 110 to be sequentially disposed in the front of the light source unit 130. Accordingly, light formed with the first pattern, the second pattern and the third pattern can be sequentially radiated on the finger of the user. At this point, when the first filter 111b, the second filter 112b and the third filter 113b are arranged in a row, the moving unit 120 may be configured with a linear actuator. Accordingly, the moving unit 120 may easily move the first filter 111b, the second filter 112b and the third filter 113b in a linear direction.

Meanwhile, the pattern unit 110 may be configured with a pattern display device. That is, the pattern unit 110 may be configured with a pattern display device capable of sequentially displaying a predetermined number of predefined patterns. For example, the pattern unit 110 may be configured with a digital pattern projector, but it is not limited thereto. As the pattern unit 110 is formed of a pattern display device, it may sequentially indicate three kinds of filters to form a first pattern, a second pattern and a third pattern on the light radiated from the light source unit 130. Accordingly, the finger of the user can be sequentially irradiated with light formed with the first pattern, the second pattern and the third pattern.

Furthermore, the pattern unit 110 may include a cylinder lens (not shown) disposed to be spaced apart from the light source unit 130 by a predetermined distance so as to collect the light radiated from the light source unit 130, a rotational polygon mirror (not shown) disposed to be spaced apart from the cylinder lens by a predetermined distance so as to redirect the light collected through the cylinder lens while rotating in one direction, and a filter (not shown) disposed to be spaced apart from the rotational polygon mirror by a predetermined distance so as to form a pattern on the light redirected by the rotational polygon mirror and passing through the filter. The rotational polygon mirror may be rotated in one direction to change the angle of the light radiated on the filter. When the angle of the light radiated on the filter is changed, a pattern formed through the filter can be changed. For example, when the rotational polygon mirror is rotated by a predetermined angle to redirect the light collected through the cylinder lens, a first pattern can be formed on the light passing through the filter. In addition, when the rotational polygon mirror is further rotated by a predetermined angle to redirect the light collected through the cylinder lens, a second pattern can be formed on the light passing through the filter. Moreover, when the rotational polygon mirror is still further rotated by a predetermined angle to redirect the light collected through the cylinder lens, a third pattern can be formed on the light passing through the filter. Accordingly, the finger of the user can be sequentially irradiated with the light formed with the first pattern, the second pattern and the third pattern.

On the other hand, the pattern unit 110 may be formed to have a projector structure using optical interference. More specifically, the pattern unit 110 may be formed with at least one slit (not shown). The light radiated from the light source unit 130 may pass through the slit of the pattern unit 110. As the light radiated from the light source unit 130 passes through the slit of the pattern unit 110, a pattern may be formed on the light radiated on the finger of the user. At this point, the moving unit 120 may linearly move the pattern unit 110. When the pattern unit 110 is moved, the position of the slit disposed in the front of the light source unit 130 can be changed. That is, when the position of the slit disposed in the front of the light source unit 130 is changed, a pattern formed on the light passing through the pattern unit 110 is changed. For example, when the pattern unit 110 is moved in one direction by the moving unit 120, a first pattern can be formed on the light passing through the pattern unit 110. In addition, when the pattern unit 110 is further moved in this direction by the moving unit, a second pattern can be formed on the light passing through the pattern unit 110. Moreover, when the pattern unit 110 is still further moved in this direction by the moving unit 120, a third pattern can be formed on the light passing through the pattern unit 110. Accordingly, the finger of the user can be sequentially irradiated with the light formed with the first pattern, the second pattern and the third patter.

Figure 5:
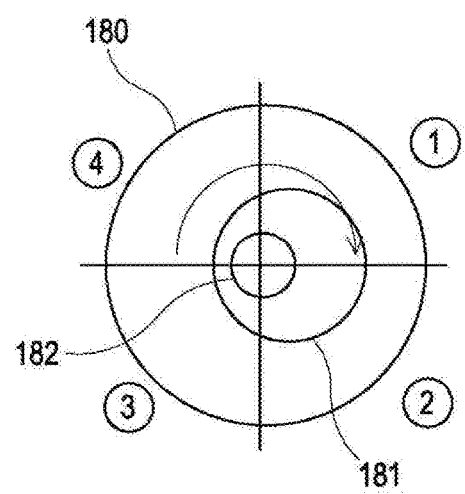
FIG. 5 is a view schematically showing an embodiment of a configuration applicable to the vibration unit shown in FIG. 2.

On still the other hand, the device may further include a vibration unit 180. At this point, the pattern unit 110 may be formed of a filter for forming a grid pattern on the light radiated from the light source unit 130 and passing through the pattern unit, and the moving unit 120 may linearly move the pattern unit 110 to be disposed in the front of the light source unit 130. Referring to FIG. 5, the vibration unit 180 may include a vibration weight 181 for generating vibration, a rotation unit 182 for rotating the vibration weight 181 in one direction, and the like.

At this time, the rotation unit 182 may be connected to the control unit 170 and controlled by the control unit 170 to rotate the vibration weight 181. When the vibration weight 181 is moved to a position in a first, second, third or fourth area in the vibration unit 180 shown in FIG. 5, the control unit 170 may sense the movement. That is, when the vibration weight 181 is rotated in the vibration unit 180, vibration, i.e., repetitive movement around a point, is generated in portable equipment.

Accordingly, in a case where photographing is performed through the camera unit 140 at a time point when the vibration weight 181 completes the movement into each of the first, second, third and fourth areas, there is an effect of moving the grid pattern of the pattern unit 110 according to rotation of the vibration weight 181 in a state where the pattern unit 110 is disposed above the light source unit 130, whereby various grid patterns can be generated through one pattern unit 110.

At this time, the camera unit 140 may be shaken due to the vibration of the portable equipment during photographing of the finger of the user irradiated with the light formed with a pattern, although a shaking correction is performed on an image photographed by the camera unit 140 by causing a data generation unit 150 described below to include the shaking, which has been generated by the rotation of the vibration weight 181, as a parameter to generate phase data used for fingerprint recognition.

Figure 6:
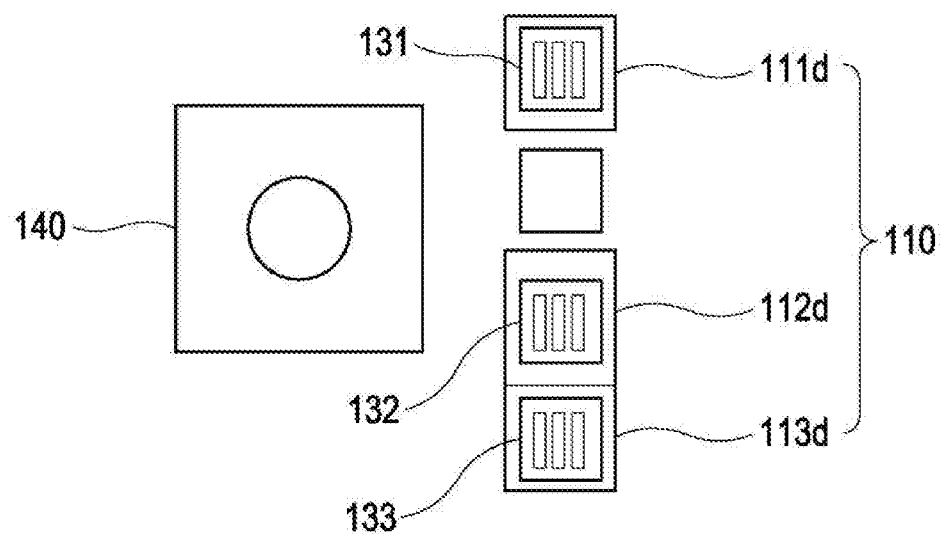
FIG. 6 is a view schematically showing a third embodiment of a configuration applicable to the pattern unit shown in FIG. 2.

Meanwhile, in a case where the light source unit 130 includes a first light source unit 131, a second light source unit 132 and a third light source unit 133 in addition to a main light source unit (not shown), the pattern unit 110 may include a first pattern unit 111d disposed in the front of the first light source unit 131 to form a first pattern on a light radiated from the first light unit 131, a second pattern unit 112d disposed in the front of the second light source unit to form a second pattern on a light radiated from the second light unit 132, and a third pattern unit 113d disposed in the front of the third light source unit 133 to form a third pattern on a light radiated from the third light unit 133 (see FIG. 6). The first light source unit 131, the second light source unit 132 and the third light source unit 133 are controlled by the control unit 170 of the portable equipment to sequentially radiate light. When the first light source unit 131, the second light source unit 132 and the third light source unit 133 sequentially radiate light, the finger of the user can be sequentially irradiated with the light formed with the first pattern, the second pattern and the third pattern.

That is, the method of measuring a three-dimensional shape according to an embodiment of the present disclosure may sequentially radiate light that has been formed with various patterns to be radiated on the finger of the user by the embodiment of the pattern unit 110 described above.

Moreover, the configuration of the pattern unit 110 described above is merely an example, and so far as the pattern unit 110 has a configuration capable of forming grid patterns of different phases on a light radiated from the light source unit 130, various structures and arrangements may be applied thereto.

Hereinafter, for the convenience of explanation, descriptions will be made by focusing on a case where the pattern unit 110 includes the first filter 111a, the second filter 112a and the third filter 113a and the first filter 111a, the second filter 112a and the third filter 113a are arranged in a circular fashion, although it is not limited thereto and it is apparent that all the various embodiments described above can be applied.

Next, the camera unit 140 installed in the electronic device generates image data by photographing the finger of the user irradiated with the light formed with a pattern (step S120). At this time, the camera unit 140 may be controlled by the control unit 170 to photograph the finger of the user whenever a pattern formed on the light radiated on the finger of the user is changed. For example, when the light formed with the first pattern is radiated on the finger of the user in a state where the pattern unit 110 is rotationally moved by the moving unit 120 and the first filter 111a is disposed in the front of the light source unit 130, the camera unit 140 may generate image data by photographing the finger of the user. Furthermore, when the light formed with the second pattern is radiated on the finger of the user in a state the pattern unit 110 is further rotated by the moving unit 120 and the second filter 112a is disposed in the front of the light source unit 130, the camera unit 140 may generate image data by photographing the finger of the user. Finally, when the light formed with the third pattern is radiated on the finger of the user in a state where the pattern unit 110 is still further rotated by the moving unit 120 and the third filter 113a is disposed in the front of the light source unit 130, the camera unit 140 may generate image data by photographing the finger of the user. That is, the camera unit 140 may generate three pieces of image data in correspondence to the number of patterns formed on the light radiated on the finger of the user.

Meanwhile, while the camera unit 140 photographs the finger of the user irradiated with the light formed with a pattern, the finger of the user may be placed at a position spaced apart from the camera unit 140 by a predetermined distance. As a result, the method of measuring a three-dimensional shape according to the embodiment of the present disclosure may prevent distortion of the finger image, which is caused due to photographing of the finger of the user in contact with the camera unit 140. In addition, since finger image data in which a finger image is not distorted is used, the accuracy of fingerprint recognition can be improved.

Next, the data generation unit 150 installed in the electronic device extracts a phase of the fingerprint of the finger of the user by using the finger image data and generates phase data (step S130). As described above, since three pieces of image data are generated by the camera unit 140, the data generation unit 150 may generate the phase data using the three pieces of image data. The method of generating the phase data by the data generation unit 150 will be described below in greater detail.

The data generation unit 150 may extract three degrees of brightness $\{I^i_1, I^i_2, I^i_3\}$ from the three pieces of image data. The data generation unit 150 may calculate a phase $\{P_i(x,y)\}$, average brightness $\{A_i(x,y)\}$ and visibility $\{V_i(x,y)\}$ through the extracted degrees of brightness and a three-bucket algorithm. An equation used when the data generation unit 150 calculates the phase $\{P_i(x,y)\}$, the average brightness $\{A_i(x,y)\}$ and the visibility $\{V_i(x,y)\}$ is represented by Equation 1 below. At this time, $I^i_1$ may be a+b $\cos(\varphi)$, $I^i_2$ may be a+b $\cos(\varphi+2\pi/3)$, and $I^i_3$ may be a+b $\cos(\varphi+4\pi/3)$.

$$P_i(x, y) = \tan^{-1} \frac{\sqrt{3}\,(I^i_3 - I^i_2)}{2I^i_1 - I^i_2 - I^i_3}$$

$$A_i(x, y) = \frac{I^i_1 + I^i_2 + I^i_3}{3}$$

$$V_i(x, y) = \frac{B_i}{A_i} = \frac{\sqrt{(2I^i_1 - I^i_2 - I^i_3)^2 + 3(I^i_2 - I^i_3)^2}}{(I^i_1 + I^i_2 + I^i_3)}$$

Equation 1

In Equation 1, $B_i(x,y)$ may mean the amplitude of an image signal of the three pieces of image data.

Then, the data generation unit 150 may calculate an initial height $\{H_i(x,y)\}$ from the phase $\{P_i(x,y)\}$. An equation used when the data generation unit 150 calculates the height $\{H_i(x,y)\}$ may be represented by Equation 2 below.

$$H_i(x,y)=k_i(x,y)\cdot P_i(x,y)$$

Equation 2

In Equation 2, $k_i(x,y)$ represents a conversion ratio between the phase and the height and may mean a phase-to-height conversion scale.

Moreover, the data generation unit 150 may calculate a height weighting factor $\{W_i(x,y)\}$ using at least one of the average brightness $\{A_i(x,y)\}$, the visibility $\{V_i(x,y)\}$ and a measurement range ($\lambda$). At this time, as described above, the pattern formed on the light radiated on the finger of the user may be a grid pattern, and the measurement range ($\lambda$) may mean an interval between grids of the grid pattern. The fingerprint data generation unit 150 may calculate the height weighting factor $\{W_i(x,y)\}$ through a weighting factor function $\{f(A,V_i,\lambda)\}$ using the average brightness $\{A_i(x,y)\}$, the visibility $\{V_i(x,y)\}$ and the measurement range ($\lambda$) as parameters, and an equation used when the data generation unit 150 calculates the height weighting factor $\{W_i(x,y)\}$ may be represented by Equation 3 below.

$$W_i(x,y)=f(A,V_i,\lambda)$$

Equation 3

The data generation unit 150 may calculate a weighting factor height $\{H_i(x,y)*W_i(x,y)\}$ by multiplying the initial height $\{H_i(x,y)\}$ by the height weighting factor $\{W_i(x,y)\}$. The data generation unit 150 may calculate a final height by dividing the weighting factor height $\{H_i(x,y)*W_i(x,y)\}$ by the sum of the height weighting factors $\{W_i(x,y)\}$, and the calculated final height value may be a value close to an average value of the weighting factor heights $\{H_i(x,y)*W_i(x,y)\}$ or a median of values of the weighting factor heights $\{H_i(x,y)*W_i(x,y)\}$ calculated from the respective three pieces of image data.

Meanwhile, as for another method of calculating the final height, if a signal deviating from an acceptable range of a pixel-unit pattern image based on at least one of brightness, SNR and phase blurring, for example, a spike signal, is generated upon calculation of the initial height $\{H_i(x,y)\}$, this is determined as noise and removed to calculate the initial height $\{H_i(x,y)\}$; and if there is a spike height deviating from a predetermined acceptable range of each of the initial heights, this may also be removed as noise to calculate the final height.

That is, the data generation unit 150 may extract phase data on phases generated from ridges of a fingerprint at a certain position of the finger of the user. That is, a fingerprint recognition method according to an embodiment of the present disclosure may three-dimensionally recognize a fingerprint by extracting the phase data from the finger image data by the data generation unit 150.

Next, the data generation unit 150 generates feature value data on feature values of the fingerprint using the phase data (step S140). At this time, since the phase data is data on phases generated by the ridges of the concave fingerprint at a certain position of the finger of the user as described above, it may be feature values extracted from an undulating three-dimensional image or pattern generated by the ridges of the fingerprint or from a two-dimensional image or pattern generated by unwrapping the three-dimensional image or pattern.

Finally, a determination unit 160 uses the feature value data and reference value data to determine whether they are matched with each other (step S150). At this time, the reference value data may be generated by pre-storing reference values generated though recognition of the fingerprint of the user in the aforementioned process into a memory unit (not shown) of the electronic device.

The determination unit 160 may compare a feature value included in the feature value data with a reference value included in the reference value data to determine whether a pre-stored fingerprint matches a currently recognized fingerprint. For example, the determination unit 160 may compare the feature value included in the feature value data with the reference value included in the reference value data, and if the two values are matched, determine that the currently recognized fingerprint matches the pre-stored fingerprint. On the Contrary, the determination unit 160 may compare the feature value included in the feature value data with the reference value included in the reference value data, and if the two values are not matched, determine that the currently recognized fingerprint does not match the pre-stored fingerprint.

According to the device and method for measuring a three-dimensional shape according to the embodiment of the present disclosure, the data generation unit 150 generates the feature value data of a fingerprint from the phase data of the fingerprint and the determination unit 160 recognizes the fingerprint of the user using the feature value data, thereby improving the accuracy of fingerprint recognition.

Meanwhile, information on the determination result generated by the device and method for measuring a three-dimensional shape according to the embodiment of the present disclosure can be provided to an electronic device and used for various applications requiring authentication, such as opening of a door, unlocking of a cellular phone, a payment and the like.

As for another embodiment of the step of determining whether the feature value data and the reference value data match or not (step S150), at this time, the reference value data may be an MRI, CT, ultrasonic or X-ray image data and may be registered with the feature value data in a state where the reference value data has been already stored in the memory unit (not shown) of the electronic device. That is, after configuration is made such that shape information of the feature value data overlaps with shape information of the reference value data, this may be displayed on a screen mounted on the electronic device as registered data, or the registered data may be transmitted to a separate display device.

Hereinafter, a method of recognizing a fingerprint of a user will be described with reference to FIG. 7 that shows a sequence of a method of measuring a three-dimensional shape according to another embodiment of the present disclosure. Furthermore, same reference numerals may represent same members, and the following description will be made while focusing on portions different from the aforementioned method of measuring a three-dimensional shape according to the embodiment of the present disclosure.

Figure 7:
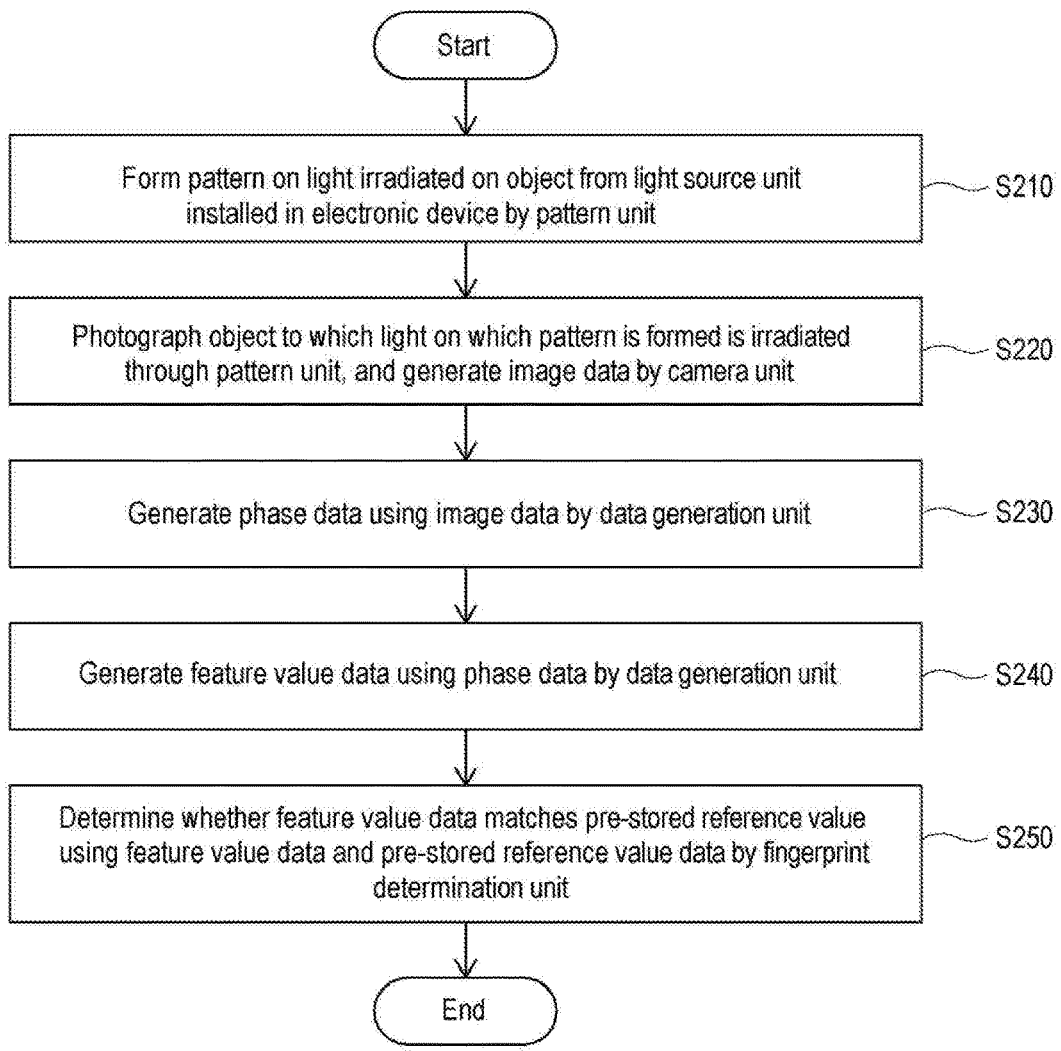
FIG. 7 is a flowchart showing a sequence of a method of measuring a three-dimensional shape according to another embodiment of the present disclosure.

Referring to FIG. 7, a pattern unit 110 installed in an electronic device (not shown) first forms a pattern on a light radiated on a finger of a user from a light source unit 130 installed in an electronic device (step S210). The pattern unit 110 may be installed in the electronic device to be spaced apart from the light source unit 130 by a predetermined distance to form a predetermined pattern on the light passing through the pattern unit. That is, the finger of the user may be irradiated with the light formed with a predetermined pattern. At this time, the predetermined pattern may be a grid pattern.

Figure 8:
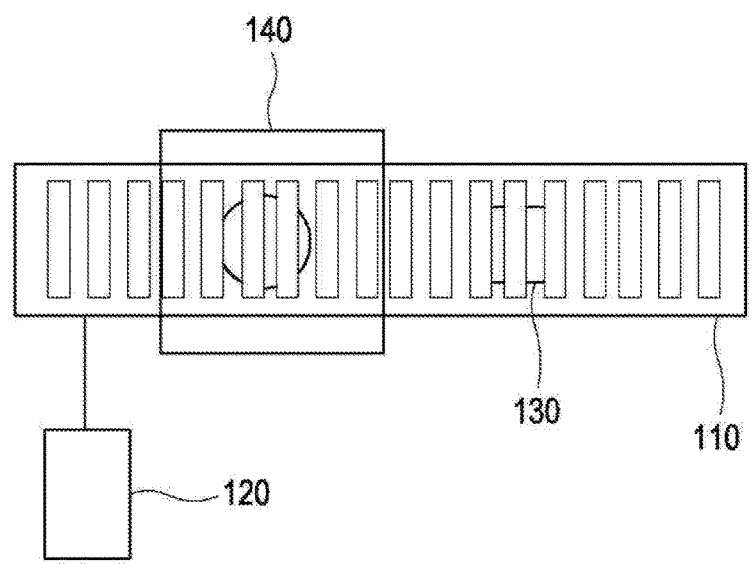
FIG. 8 is a view schematically showing a fourth embodiment of a configuration applicable to the pattern unit shown in FIG. 2.

The pattern unit 110 may be formed in a shape allowing it to be disposed in the front of the light source unit 130 and a camera unit 140 (see FIG. 8). For example, as shown in FIG. 8, the pattern unit 110 may be formed in a rectangular shape and disposed in the front of the light source unit 130 and the camera unit 140, but it is not limited thereto. A moving unit 120 connected to the pattern unit 110 may move the pattern unit 110 so that the pattern unit 110 may be disposed in the front of the light source unit 130 and the camera unit 140.

Next, the camera unit 140 generates image data by photographing the finger of the user irradiated with the light formed with a pattern through the pattern unit 110 (step S220). Since the camera unit 140 photographs the finger of the user through the pattern unit 110, a pattern, in which the pattern formed from the light radiated on the finger of the user overlapped with the pattern of the pattern unit 110, may be formed on the finger image, in data on the finger image photographed by the camera unit 140. At this time, the pattern in which the pattern formed from the light radiated on the finger of the user overlapped with the pattern of the pattern unit 110 may be a Moire pattern. That is, the image data generated by the camera unit 140 may be formed as an image having a Moire pattern formed on the finger image.

Next, the data generation unit 150 installed in the electrode device extracts a phase of the fingerprint of the finger of the user by using the image data and generates phase data (step S230). At this time, the data generation unit 150 may extract the phase of the fingerprint of the finger of the user by applying the Fast Fourier Transform (FFT) to the image data and generates the phase data.

Next, the data generation unit 150 generates feature value data on feature values of the fingerprint using the phase data (step S240).

In the method of measuring a three-dimensional shape according to the other embodiment of the present disclosure, a phase of a fingerprint and a feature value of the fingerprint can be extracted using only one piece of image data in which a grid pattern is formed on the finger image. That is, a fingerprint recognition method according to the other embodiment of the present disclosure may simplify a process of recognizing a fingerprint.

Finally, a determination unit 160 determines whether the feature value data and the reference value data (step S250) match or not. The determination unit 160 may compare a feature value included in the feature value data with a reference value included in the reference value data and if the two values match, determine that the fingerprint matches. On the contrary, the determination unit 160 may compare the feature value included in the feature value data with the reference value included in the reference value data and if the two values do not match, determine that the fingerprint is not matched match.

Figure 9:
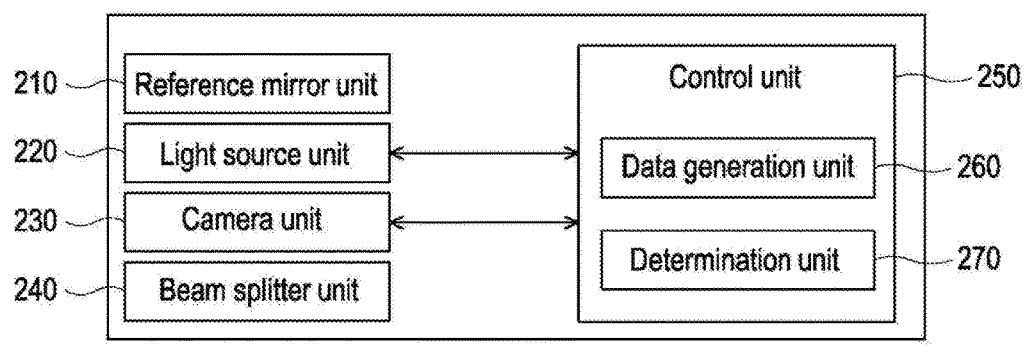
FIG. 9 is a view showing a configuration of a device for measuring a three-dimensional shape according to an embodiment of the present disclosure.
Figure 10:
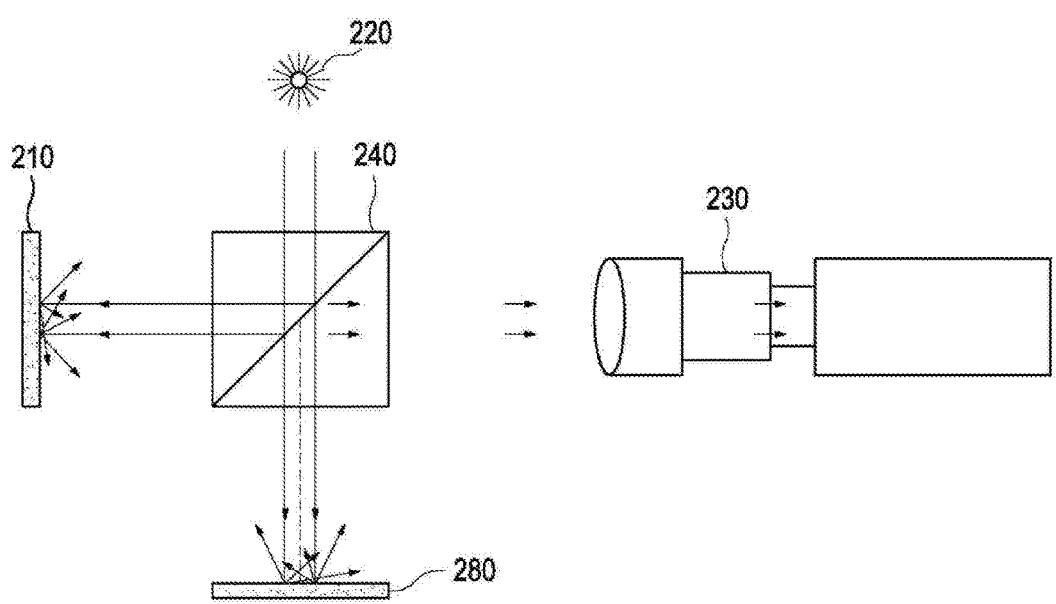
FIG. 10 is a view illustrating a measurement principle of the device for measuring a three-dimensional shape according to the embodiment of the present disclosure.

Meanwhile, hereinafter, a device for measuring a three-dimensional shape according to another embodiment of the present disclosure will be described. FIG. 9 is a view showing a configuration of a device for measuring a three-dimensional shape according to an embodiment of the present disclosure, and FIG. 10 is a view illustrating a measurement principle of the device for measuring a three-dimensional shape according to the embodiment of the present disclosure.

Referring to FIG. 9 described above, the device for measuring a three-dimensional shape according to the embodiment of the present disclosure may be mounted on a small electronic device so as to be implemented in a portable or handheld type, and may include a light source unit 220, a beam splitter unit 240 for splitting light radiated from the light source unit, a reference mirror unit 210 for reflecting light incident from the beam splitter unit 240, a camera unit 230 for generating an OCT (Optical Coherence Tomography) image data by photographing light, which is incident on an object from the beam splitter unit 240 and reflected by the object, and the light reflected by the reference mirror unit 210, and a control unit 250 for controlling the light source unit 220 and the camera unit 230. The control unit 250 may include a data generation unit 260 for generating phase data of the object using the image data and generating feature value data on a feature value of the object using the phase data, and a determination unit 270 for determining whether the feature value and pre-stored reference value data match or not.

Descriptions of the same operations as those of the control unit 250, the data generation unit 260 and the determination unit 270 will be omitted for the convenience of explanation.

The light incident on the beam splitter unit 240 from the light source unit 220 is split and incident on the reference mirror unit 210 and the object 280. The light incident on the reference mirror unit 210 and the object 280 are reflected and then incident on the camera unit 230 through the beam splitter unit 240.

The camera unit 230 generates OCT (Optical Coherence Tomography) three-dimensional image data using the incident light. At this time, the OCT three-dimensional image data may generate even an image of a tissue at a predetermined depth in the skin. Since the image of the tissue at a predetermined depth in the skin as well as the shape of the epidermis of the skin can be generated, if an artificial fingerprint made of silicone is used, the fingerprint can be identified as being an artificial fingerprint. That is, since the artificial fingerprint is positioned in the front of the epidermis of the skin, this can be correctly determined.

The data generation unit 260 may generate feature value data of skin tissue at a predetermined depth from the epidermis as well as feature value data of a fingerprint of a finger, based on the OCT three-dimensional image data. The determination unit 270 may not only compare the feature value with a preset reference value but also confirm whether a fingerprint is an artificial fingerprint, thereby further improving the reliability of authentication. Although the embodiments of the present disclosure have been described above, those skilled in the art may calculate three-dimensional shapes of various objects including a fingerprint and make changes and modifications to embodiments of the present disclosure by adding, changing, deleting or supplementing a component without departing from the spirit of the present disclosure stated in the claims, and the changes and modifications will be also considered as being included in the scope of the present disclosure.

What is claimed is:

1. An apparatus for measuring a three-dimensional shape, comprising:
   a light source;
   a pattern display device including at least two filters configured to form at least two different patterns on light that is radiated from the light source;
   a camera configured to generate image data by photographing an object irradiated with the light formed with the patterns; and
   a controller configured to generate phase data of the object using the image data and generate feature value data of the object using the phase data,
   wherein the at least two filters comprise:
      a first filter configured to form a first pattern on the light radiated from the light source and passing through the first filter,
      a second filter configured to form a second pattern on the light radiated from the light source and passing through the second filter, and
      a third filter configured to form a third pattern on the light radiated from the light source and passing through the third filter.

2. The apparatus of claim 1, wherein the first filter, the second filter and the third filter are arranged in a circular fashion.

3. The apparatus of claim 2, further comprising:
   an actuator configured to sequentially arrange the first filter, the second filter and the third filter at the front of the light source by rotationally moving the pattern display device.

4. The apparatus of claim 1, wherein the first filter, the second filter and the third filter are arranged in a row.

5. The apparatus of claim 4, further comprising:
   an actuator configured to sequentially arrange the first filter, the second filter and the third filter at the front of the light source by linearly moving the pattern display device.

6. An apparatus for measuring a three-dimensional shape, comprising:
   a light source;
   a pattern display device including at least two filters configured to form at least two different patterns on light that is radiated from the light source;
   a camera configured to generate image data by photographing an object irradiated with the light formed with the patterns; and
   a controller configured to generate phase data of the object using the image data and generate feature value data of the object using the phase data,
   wherein the pattern display device comprises:
      a cylinder lens configured to collect the light radiated from the light source,
      a rotational polygon mirror configured to redirect the light collected through the cylinder lens while rotating in one direction, and
      a fourth filter configured to form a fourth pattern on the light redirected by the rotational polygon mirror and passing through the fourth filter.

7. An apparatus for measuring a three-dimensional shape, comprising:
   a light source;
   a pattern display device including at least two filters configured to form at least two different patterns on light that is radiated from the light source, the at least two different patterns having phases different from one another;
   a camera configured to generate image data by photographing an object irradiated with the light formed with the at least two different patterns; and
   a controller configured to generate phase data of the object using the image data and generate feature value data of the object using the phase data,
   wherein the pattern display device further comprises at least one slit configured to form a pattern on the light radiated from the light source and passing through the pattern display device,
   wherein the object is a finger of a subject to be measured, and the phase data is phase data of a fingerprint of the finger, and
   wherein the at least two filters comprise:
      a first filter configured to form a first pattern on the light radiated from the light source and passing through the first filter,
      a second filter configured to form a second pattern on the light radiated from the light source and passing through the second filter, and
      a third filter configured to form a third pattern on the light radiated from the light source and passing through the third filter.

8. An apparatus for measuring a three-dimensional shape, comprising:
a light source;
a pattern display device including at least two filters configured to form at least two different patterns on light that is radiated from the light source, the at least two different patterns having phases different from one another;
a camera configured to generate image data by photographing an object irradiated with the light formed with the at least two different patterns;
a controller configured to generate phase data of the object using the image data and generate feature value data of the object using the phase data; and
a vibrator having a vibration weight configured to generate vibration and a rotator configured to rotate the vibration weight in one direction,
wherein the object is a finger of a subject to be measured, and the phase data is phase data of a fingerprint of the finger, and
wherein the at least two filters comprise:
a first filter configured to form a first pattern on the light radiated from the light source and passing through the first filter,
a second filter configured to form a second pattern on the light radiated from the light source and passing through the second filter, and
a third filter configured to form a third pattern on the light radiated from the light source and passing through the third filter.

9. An apparatus for measuring a three-dimensional shape, comprising:
a light source;
a pattern display device configured to form at least two different patterns on light that is radiated from the light source;
a camera configured to generate image data by photographing an object irradiated with the light formed with the patterns; and
a controller configured to generate phase data of the object using the image data and generate feature value data of the object using the phase data,
wherein the light source comprises:
a first light source,
a second light source, and
a third light source, and
wherein the pattern display device comprises:
a first pattern display device disposed at the front of the first light source to form a first pattern on the radiated light,
a second pattern display device disposed at the front of the second light source to form a second pattern on the radiated light, and
a third pattern display device disposed at the front of the third light source to form a third pattern on the radiated light.

10. The apparatus of claim 1, 6 or 9, wherein the object is a finger of a subject to be measured, and the phase data is phase data of a fingerprint of the finger.

11. The apparatus of claim 10, wherein the controller is further configured to determine whether the feature value data and pre-stored reference value data match or not.

12. The apparatus of claim 1, 6 or 9, wherein the object is at least a part of a body or a skin tissue of a subject to be measured.

13. A method of measuring a three-dimensional shape, comprising:
forming, by a pattern display device including at least two filters configured to form at least two different patterns, a pattern on light that is radiated from a light source to an object;
generating, by a camera, image data by photographing the object irradiated with the light formed with the pattern; and
generating, by a controller, phase data of the object using the image data and generating feature value data on a feature value of the object using the phase data,
wherein the at least two filters comprise:
a first filter configured to form a first pattern on the light radiated from the light source and passing through the first filter,
a second filter configured to form a second pattern on the light radiated from the light source and passing through the second filter, and
a third filter configured to form a third pattern on the light radiated from the light source and passing through the third filter.

14. An apparatus for measuring a three-dimensional shape, comprising:
a light source;
a pattern display device including at least two filters configured to form at least two different patterns on light that is radiated from the light source;
a camera configured to generate image data by photographing a finger of a user irradiated with the light formed with the patterns; and
a controller configured to:
generate phase data of the finger of the user using the image data;
generate feature value data of the finger of the user using the phase data; and
determine whether the feature value data and pre-stored reference value data match or not,
wherein the at least two filters comprise:
a first filter configured to form a first pattern on the light radiated from the light source and passing through the first filter,
a second filter configured to form a second pattern on the light radiated from the light source and passing through the second filter, and
a third filter configured to form a third pattern on the light radiated from the light source and passing through the third filter.

15. An apparatus for measuring a three-dimensional shape, comprising:
a light source;
a beam splitter configured to split light that is radiated from the light source;
a reference mirror configured to reflect light incident from the beam splitter;
a camera configured to generate OCT (Optical Coherence Tomography) image data by photographing light incident on an object from the beam splitter and reflected by the object and the light reflected by the reference mirror;
a controller configured to:
generate phase data of the object using the image data;
generate feature value data of a feature value of the object using the phase data;
determine whether the feature value and pre-stored reference value data match or not;
determine whether the object is a finger based on the feature value of the object; and if a foreign material other than the finger is included, determine that the object is an artificial fingerprint.

16. An apparatus for measuring a three-dimensional shape, comprising:
- a light source;
- a pattern display device including at least two filters configured to form at least two different patterns on light that is radiated from the light source, the at least two different patterns having phases different from one another;
- a camera configured to generate image data by photographing an object irradiated with the light formed with the at least two different patterns; and
- a controller configured to generate phase data of the object using the image data and generate feature value data of the object using the phase data, wherein the pattern display device is disposed at the front of the light source and the camera, wherein the object is a finger of a subject to be measured, and the phase data is phase data of a fingerprint of the finger, and wherein the at least two filters comprise:
- a first filter configured to form a first pattern on the light radiated from the light source and passing through the first filter,
- a second filter configured to form a second pattern on the light radiated from the light source and passing through the second filter, and
- a third filter configured to form a third pattern on the light radiated from the light source and passing through the third filter.

* * * * *